April 26, 1938.  C. GOTTFRIED ET AL  2,115,102
APPARATUS FOR FORMING CAKE LAYERS
Filed Jan. 21, 1936   2 Sheets-Sheet 1
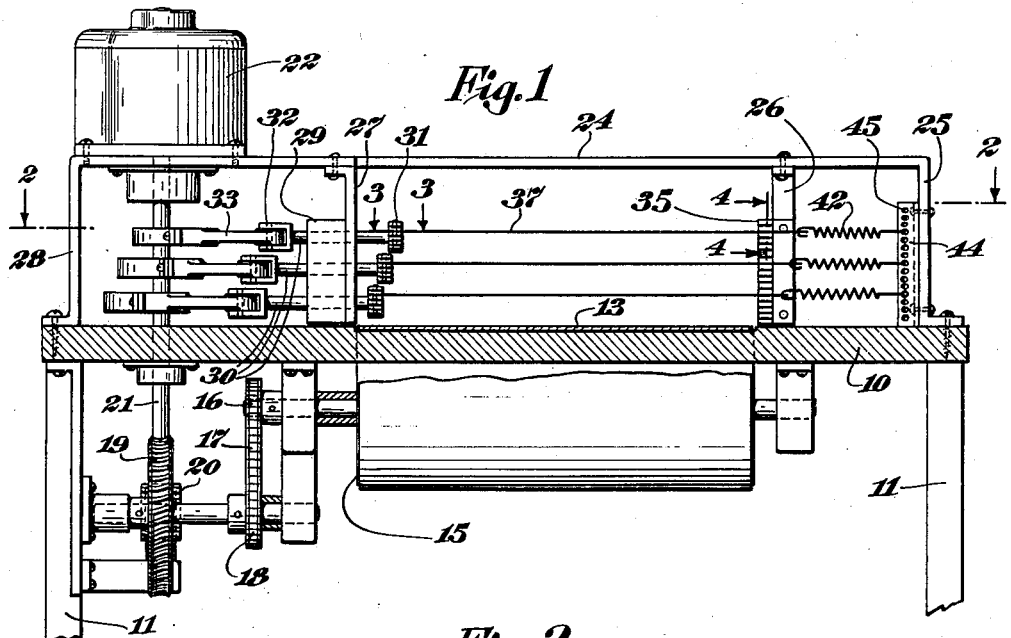
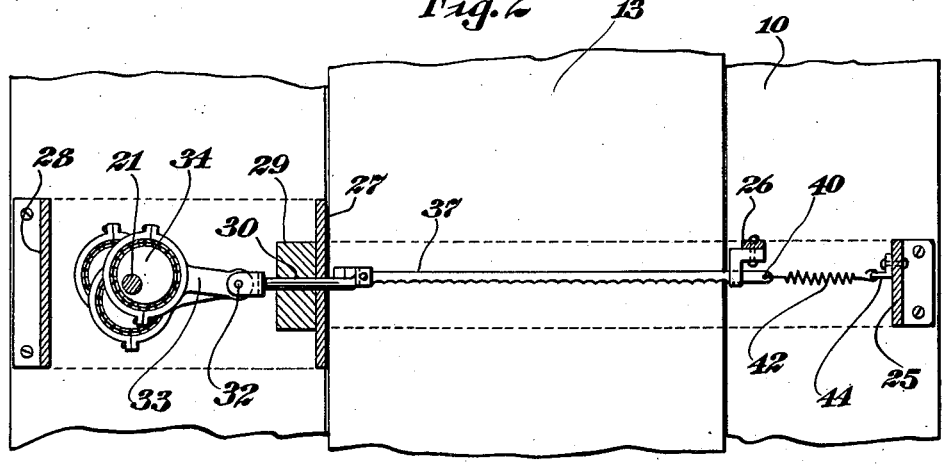
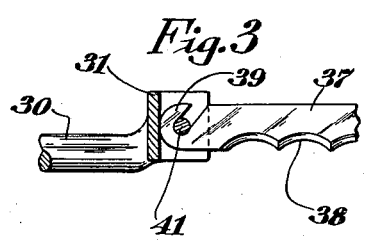
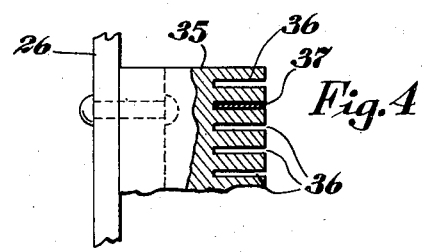
INVENTORS,
Charles Gottfried,
Jack MacManus,
BY Frederick Breitenfeld
ATTORNEY.

April 26, 1938.　　C. GOTTFRIED ET AL　　2,115,102
APPARATUS FOR FORMING CAKE LAYERS
Filed Jan. 21, 1936　　2 Sheets-Sheet 2
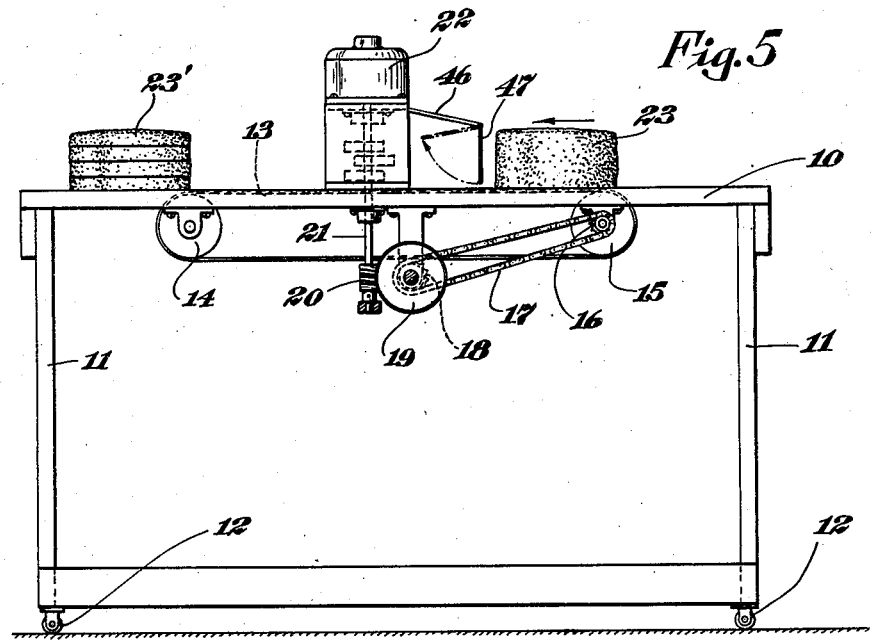
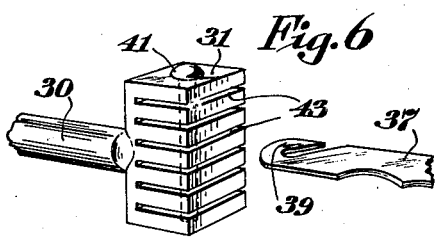
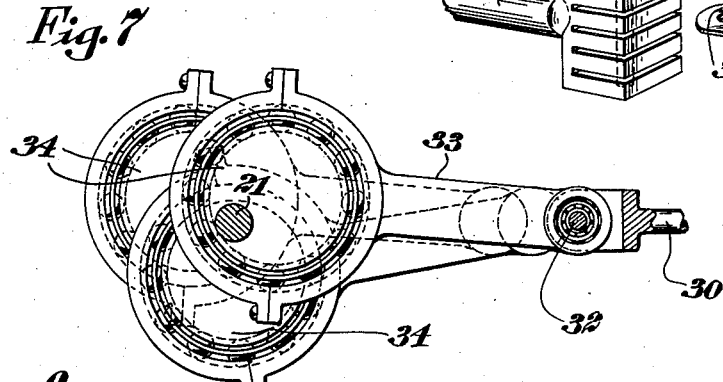
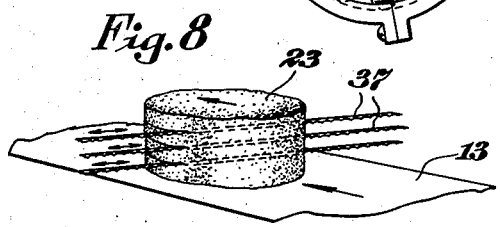
INVENTORS,
Charles Gottfried,
Jack MacManus,
BY Frederick Breitenfeld
ATTORNEY.

Patented Apr. 26, 1938

2,115,102

UNITED STATES PATENT OFFICE 2,115,102

APPARATUS FOR FORMING CAKE LAYERS

Charles Gottfried and Jack MacManus, New York, N. Y.

Application January 21, 1936, Serial No. 60,028

4 Claims. (Cl. 146—151)

Our present invention relates generally to the baking art, and has particular reference to an apparatus for subdividing a cake body into a set of superposed layers.

In the manufacture of layer cakes, one well-known method of procedure is to bake a series of cake layers individually and separately, and thereafter to assemble them in superposed relation with suitable creams, jellies, or other filling materials between the layers and around the cake. Such a procedure is not only tedious, time-consuming, and relatively expensive, but also fails to produce a cake of maximum tastiness because each surface of each individually baked layer is browned or caramelized, and it is well-known that these crusty areas are of impaired tastiness and flavor.

To obviate the foregoing disadvantages, attempts have been made to bake a cake body in one piece and thereafter to slice it horizontally into separate layers. This procedure is also lacking in efficiency and is beset with a number of difficulties. For example, uniformity is difficult to achieve; and the texture of the cake body is such as to render it quite difficult, without extraordinary skill, to slice it smoothly and evenly along a series of superposed planes.

In accordance with our present invention, we provide an apparatus which efficiently and uniformly slices a unitary cake body into a set of superposed layers, the apparatus being continuously usable upon a series of successive cake bodies, and operating to subdivide the cake bodies with absolutely uniform results into separate layers of predetermined thickness and number.

Briefly, our invention resides in the combination with a table along which a cake body may be advanced, of a series of superposed horizontal knives arranged in the path of the advancing cake body, together with means for reciprocating the knives.

One of the features of the invention lies in providing a means for reciprocating the knives in what we prefer to term a counterbalanced timed relation, whereby the smooth advancement of the cake is unimpaired by the sidewise stresses which are imparted to the cake body during the slicing procedure.

A further feature of the invention lies in associating the knives with a movable belt conveyor, whereby a plurality of cake bodies may be successively advanced at a uniform rate to and through the field of action of the reciprocating knives. Preferably, the driving power for reciprocating the knives is simultaneously adapted to advance the conveyor at a predetermined rate of speed.

A further and important feature of the invention lies in the provision of means for adjusting or varying the vertical distance of each knife from the table or conveyor. This adjustability permits the vertical spacing between individual knives to be varied at will, thereby permitting a cake body to be subdivided in different ways, i. e., with layers of selected varying thicknesses.

We have found that our invention is of particular utility and value where three superposed knives are employed. The use of three knives permits a cake body to be divided into four layers, and in actual practice we prefer to arrange the uppermost knife closely adjacent to the top of the cake body so that the uppermost layer is merely a sliver or slab which is not used in the finished cake but which is shorn off for the purpose of establishing a fixed predetermined height for the finished layer cake.

We achieve the foregoing objects and advantages, and such other objects and advantages as may hereinafter appear or be pointed out, in the manner illustratively exemplified in the accompanying drawings, wherein—

Figure 1 is a vertical end view, partly in cross-section, of an apparatus of the present character;

Figure 2 is a horizontal cross-sectional view taken substantially along the line 2—2 of Figure 1;

Figure 3 is an enlarged fragmentary view taken substantially along the line 3—3 of Figure 1;

Figure 4 is an enlarged fragmentary view taken substantially along the line 4—4 of Figure 1;

Figure 5 is a side view of the apparatus on a somewhat reduced scale;

Figure 6 is a fragmentary perspective view of a knife holder;

Figure 7 is an enlarged plan view of the eccentrics which reciprocate the knives; and Figure 8 is a fragmentary perspective view illustrating the general mode of operation of the present apparatus.

A table 10 is supported on legs or the like 11, and is preferably provided with casters 12 to permit it to be moved about as a unit. It will be understood, however, that the provision of casters is not essential, and that the apparatus may be installed in a relatively permanent and fixed manner.

In the illustrated embodiment, a movable belt conveyor 13 is provided, the upper surface being flush with the table 10. This conveyor may be driven in any suitable manner, and we have illustratively shown guide pulleys 14 and 15, a driving pinion 16 on the pulley 15, and a chain 17 for driving the pinion 16. Preferably, the chain 17 derives its power from a pinion 18 coaxially mounted with a worm wheel 19 driven by a worm 20, the latter being mounted on the motor shaft 21 of the electric motor 22.

A cake body 23 may be placed on the conveyor, as indicated in Figure 5, and the movement of the conveyor will advance the same to and through the range of action of a series of knives, ultimately delivering the cake, in the form of a set of superposed layers, as indicated at 23'. Obviously, the conveyor belt may be made as long as desired, and it is contemplated, for example, that the discharge portion of the belt may be extended to permit a series of operators to separate the layers, apply the fillings, restore the layers, and otherwise treat them during their advancement along the conveyor, so that a finished layer cake is delivered at the extreme discharge end of the conveyor.

Also, the conveyor might lead to a second conveyor which might transport the horizontally sliced cake body to other slicing apparatus for cutting it into further segments or parts.

The mounting and operation of the present series of knives is most clearly illustrated in Figures 1–4. Spanning the table 10 is an elevated frame 24 which is supported on the fixed posts 25, 26, 27, and 28. The motor 22 may be secured to the frame 24 in any suitable manner.

The post 27 carries a block 29 provided with a set of superposed bores or bearings in each of which a reciprocable rod is adapted to be mounted. These rods are designated by the reference numeral 30. On one end of each rod is a knife holder 31 presently to be described in greater detail. At the other end each rod is articulated, as at 32, to the end of an eccentric strap 33, the main portion of which engages around an eccentric 34 secured to the motor shaft 21. Roller bearings are preferably interposed between each eccentric and its eccentric strap, as shown most clearly in Figures 2 and 7; and roller bearings may also be preferably arranged at the pivot axes 32, as illustrated most clearly in Figure 7.

Carried by the post 26 is a knife guide 35 which is provided with a series of superposed horizontal slits 36 in any selected one of which a knife may be accommodated edgewise. A knife 37 is thus illustrated in cross-section in Figure 4.

Carried by the post 25 is a bracket 38 having a series of openings 39 therein.

A description of the mounting of a single blade 37 will be deemed to be sufficient, because each blade is similarly constructed and mounted in its corresponding blade holder. The blade 37 has a suitably configured cutting edge 38 and has a hooked end 39 at one end and an opening 40 at the other. The blade holder 31 (Figure 6) consists of a block having a series of superposed horizontal slits 43, this block being secured to the end of the reciprocable rod 30. A vertical pin 41 extends through the slits 43.

The blade may be accommodated in any selected slit, thereby positioning it at a predetermined distance from the table and from the adjacent knife or knives. The blade is held in place by hooking the end 39 around the pin 41, as shown in Figure 3. The remote end portion of the blade is then inserted into the corresponding slit 36 of the knife guide 35. One end of a spring 42 is then hooked into the opening 40 of the knife, and the other end of the spring is hooked into a selected one of the openings 45, depending upon the height of the blade above the table. The spring is so arranged that it will constantly exert a longitudinal tension upon the knife, and the free end of the spring is adjustably secured to the post 44, at a selected height, so that the spring will be in a substantially horizontal position.

To change the height of a blade, it is merely necessary to release the spring 42, disengage the knife from the slit 43 in which it then is, and re-engage the knife with another selected slit; a similar shifting of position being accomplished at the knife guide 35, and the spring 42 being then reconnected in a substantially horizontal position.

Preferably, the bracket or support 24 carries a protective guard 46 to the forward end of which a protective gate 47 is pivotally hung. When the cake body 23 advances, if lifts the gate 47, as shown in Figure 5, and the gate falls back into its normal position when the cake body has passed. The guard 46 and the gate 47 serve to protect the fingers of an operator from the action of the knives.

Upon reference to Figure 7, it will be observed that the three eccentrics 34 are arranged at 120° to each other. This mounting of the eccentrics effects what we prefer to term a counterbalanced reciprocation of the knives. By virtue of this arrangement, the cake body is at no time subjected to a lateral or sideward thrust in one direction only; but, on the contrary, the lateral stresses applied to the cake are at all times effectually counterbalanced. This permits the cake body to be advanced smoothly through the range of action of the knives, the advancement remaining unimpaired by any lateral shifting of the cake body. Where only two knives are employed, the eccentrics would be arranged at 180° to each other; where four knives are employed, the angular displacement of the eccentrics would be 90°.

By means of the present apparatus, large numbers of cake bodies may be successively subjected to the action of the knives, and each body will be efficiently and snugly severed into a set of superposed layers, the resultant products being absolutely uniform in accordance with predetermined adjustments of the vertical spacing between the knives.

In general, it will be understood that changes in the details, herein described and illustrated for the purpose of explaining the nature of our invention, may be made by those skilled in the art without departing from the spirit and scope of the invention as expressed in the appended claims. It is, therefore, intended that these details be interpreted as illustrative, and not in a limiting sense.

Having thus described our invention, and illustrated its use, what we claim as new and desire to secure by Letters Patent is—

1. An apparatus for forming cake layers, comprising a belt conveyor adapted to support a cake body thereon and to advance it, a set of superposed horizontal knives arranged in the path of the advancing body and adapted to slice it into a set of superposed layers, and means for reciprocating said knives, said means comprising a set of superposed bearings, a reciprocable rod mounted in each bearing, a knife holder carried by each rod, a vertical drive shaft, a set of eccentrics thereon, and driving means operatively interposed between said eccentrics and said rods, respectively, each knife holder being provided with a series of superposed horizontal slits any selected one of which is adapted to accommodate a knife edgewise therein.

2. An apparatus for forming cake layers, comprising a belt conveyor adapted to support a cake body thereon and to advance it, a set of superposed horizontal knives arranged in the path of the advancing body and adapted to slice it into a set of superposed layers, and means for reciprocating said knives, said means comprising a set of superposed bearings, a reciprocable rod mounted in each bearing, a knife holder carried by each rod, a vertical drive shaft, a set of eccentrics thereon, and driving means operatively interposed between said eccentrics and said rods, respectively, each knife holder comprising a block provided with a series of superposed horizontal slits, and a vertical pin extending through said slits, whereby a knife may be accommodated edgewise in any selected slit with its end in engagement with said pin.

3. An apparatus for forming cake layers, comprising a belt conveyor adapted to support a cake body thereon and to advance it, a set of superposed horizontal knives arranged in the path of the advancing body and adapted to slice it into a set of superposed layers, means for reciprocating said knives, and means for varying the vertical spacing between said knives, said last-named means comprising a vertical knife holder for one end of each knife, and a vertical knife guide for the remote end of the knife, said holder and guide being each provided with a series of suposed horizontal slits any selected one of which is adapted to accommodate the knife edgewise therein.

4. In an apparatus for forming cake layers, a table along which a cake body may be advanced, a horizontal knife arranged in the path of the advancing body and adapted to slice through said body, a vertical drive shaft, an eccentric thereon, a horizontally reciprocable rod driven by said eccentric, a knife holder carried by said rod and adapted to engage one end of the knife, said holder having a set of superposed horizontal slits in any selected one of which said knife may be engaged edgewise, a fixed vertical post beyond the remote end of the knife, a spring interposed between said post and knife for exerting a constant longitudinal tension upon the knife, and means for selectively securing the spring to the post at varying vertical heights.

CHARLES GOTTFRIED.
JACK MacMANUS.